March 14, 1950        H. W. BIRK        2,500,339
BLOW TORCH
Filed Jan. 8, 1947
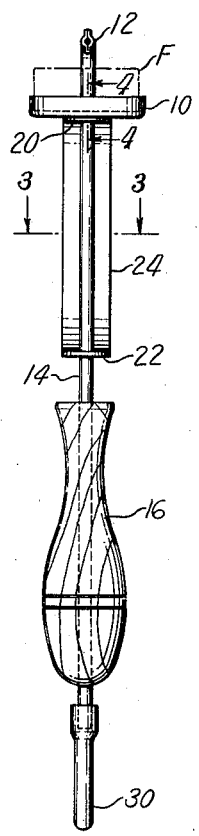
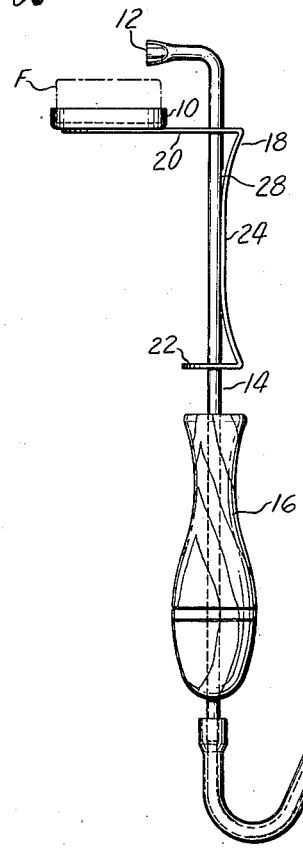
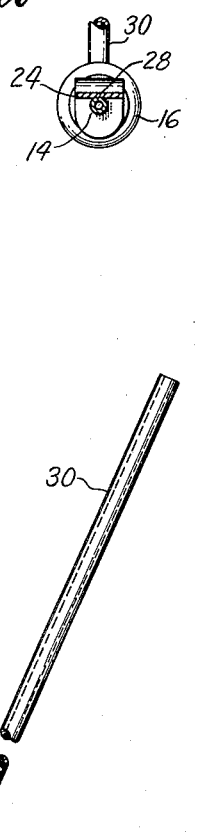
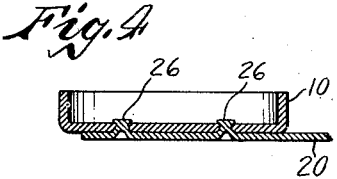
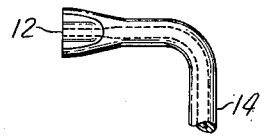
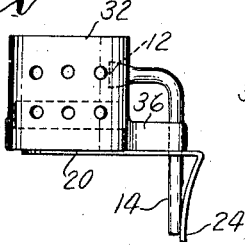
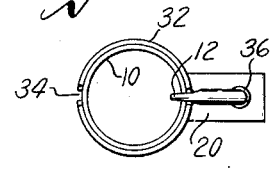
INVENTOR.
HAROLD W. BIRK
BY S. Jay Teller
ATTORNEY Patented Mar. 14, 1950

2,500,339

UNITED STATES PATENT OFFICE 2,500,339

BLOWTORCH

Harold W. Birk, East Hartford, Conn.

Application January 8, 1947, Serial No. 720,729

3 Claims. (Cl. 110—3.5)

1

The general object of the invention is to provide a simple and inexpensive blow torch adapted to utilize briquets of solid fuel, thus avoiding much of the cost and difficulties that are inherent in the use of liquid fuel.

Other and more specific objects of the invention will be apparent from the following specification and claims.

In the drawing I have shown in detail a preferred embodiment of the invention, but it will be understood that various changes may be made from the construction shown, and that the drawing is not to be construed as defining or limiting the scope of the invention, the claims forming a part of this specification being relied upon for that purpose.

Of the drawing:

Fig. 1 is a front view of a blow torch embodying the invention.

Fig. 2 is a side view.

Fig. 3 is a horizontal sectional view taken along the line 3—3 of Fig. 1.

Fig. 4 is a fragmentary vertical sectional view taken along the line 4—4 of Fig. 1.

Fig. 5 is an enlarged front view of the nozzle.

Fig. 6 is an enlarged side view of the nozzle.

Fig. 7 is a fragmentary view similar to the upper portion of Fig. 2, but showing a hood which may be used when desired.

Fig. 8 is a plan view of the parts as shown in Fig. 7.

Referring to the drawing, the blow torch incorporating the invention includes a support or cup 10 adapted to carry a briquet F of solid fuel. The cup 10 has a substantially flat bottom and a vertical peripheral wall. The invention is not limited as to the composition of the briquet F and it may be formed of any conventional or suitable material adapted to burn freely in the open air. The briquet F is preferably circular in horizontal section and the support or cup 10 is correspondingly shaped.

The blow torch also includes a nozzle 12 which is provided adjacent the support and somewhat above it so as to be adapted to direct a jet of air through the flame zone above the briquet when the latter is ignited. Air under pressure is supplied to the nozzle 12 and this forces a jet or tongue of flame laterally to engage any object required to be heated. While not necessarily so limited, the blow torch is particularly useful in soldering operations, both lead and silver, light brazing, annealing and glass working.

Preferably, means is provided for effecting relative vertical adjustment between the briquet support and the nozzle and it is also advantageous to provide means permitting relative angular movement of the jet about a vertical axis, which latter means preferably normally holds the support and the nozzle in the relative angular positions wherein the axis of the latter extends across the center of the former. The details of construction for holding the support and the jet in proper relation to each other and for attaining other desirable results may be widely varied, but the construction shown in the drawings is particularly advantageous and will be described in detail.

An imperforate tube 14 is provided having a main vertical portion and having a short horizontal portion at the top, the end of the said horizontal portion constituting the said nozzle 12. Preferably, a heat insulating handle 16 surrounds the lower part of the vertical portion of the tube 14 and serves as the means for manually holding the entire blow torch. The handle may be formed of wood or other heat insulating material.

A sheet metal holding member 18 is provided having two vertically spaced horizontal portions 20 and 22 which are apertured to receive the vertical portion of the tube 14 above the handle 16. The member 18 also comprises a resilient connecting portion 24 between the two horizontal portions 20, 22, this connecting portion 24 being so formed that it frictionally engages the side of the tube 14 to retain the holding member in place. The briquet support or cup 10 is directly connected with the upper horizontal portion 20 of the supporting member. The details of connection between the support or cup 10 and the top portion 20 of the holding member may be varied, but as shown in Fig. 4 the said portion 20 is formed with upstruck extensions 26, 26 which project through apertures in the bottom of the cup 10 and which are riveted over to firmly connect the cup with the said portion 20.

As clearly shown in Fig. 3, the vertical portion of the tube 14 is preferably provided with a flat face 28 positioned to be frictionally engaged by the before-mentioned connecting portion 24 of the holding member 18. It will be seen that the holding member 18 and the support 10 thereon are vertically adjustable relatively to the tube and the nozzle and are held in adjusted position by reason of the aforesaid frictional engagement. The flat face on the tube serves to normally hold the supporting member in such a position that the axis of the nozzle 12 extends across the center of the holder 10 and of the briquet F therein. However, the resilient connecting portion 24 can yield to permit relative angular movement so that the nozzle 12 does not obstruct the space above the briquet F.

The orifice of the nozzle 12 is preferably substantially smaller in diameter than the internal diameter of the tube 14 and this smaller orifice is provided by deforming the end of the tube, as shown in Figs. 5 and 6. A mandrel wire of suitable diameter is inserted in the end of the tube and then the sides of the tube are squeezed together by suitable forming jaws so as to flatten and spread the end portion of the tube, leaving an orifice with a diameter equal to that of the wire. The mandrel wire is then withdrawn.

Air under pressure is supplied to the bottom of the tube 14 by means of a flexible tube 30, the end of which can be placed in the mouth of the user to supply the necessary air, or can be otherwise supplied with air under pressure.

In use a briquet F is placed in the holder 10, as indicated, and the briquet is lighted. The blow torch is held by the handle 16. The holding member 18 is vertically adjusted on the tube, if necessary, to bring the flame zone in proper relationship with the nozzle. It may be desirable to adjust the holding member 18 together with the holder 10 and the briquet F upward as the briquet is consumed and is reduced in height, or to vary the size and intensity of the flame. Air from the mouth or otherwise is forced through the tube 14 and the nozzle 12 to force a jet of flame transversely from the flame zone onto the object to be heated. When one briquet has been consumed, another is put in place.

It may sometimes be desirable to use the device, otherwise than as a blow torch, for heating any desired object directly by means of the burning briquet F. In this case the nozzle 12 is turned relatively to the holding member 18 and relatively to the holder 10 and the briquet F so that it does not obstruct the space above the briquet. As already stated, the resiliency of the connecting portion 24 of the member 18 permits such movement.

When the blow torch is to be used under conditions such that draft or wind may be encountered, it may be desirable to provide a hood 32 as shown in Figs. 7 and 8. The hood 32 substantially surrounds the support 10 and the briquet F and it extends upward above the level of the nozzle 12. The hood has an opening 34 therein opposite the nozzle to permit the passage of the jet of flame. This opening 34 may be a slot extending from the top of the hood to the bottom thereof.

The details of the hood 32 may be varied, but it is preferably so formed that it engages the tube 14 as well as the support 10. As shown, the hood 32 comprises a single piece of metal which has two substantially semi-cylindrical portions which surround the support 10 and the briquet F and which has a connecting loop 36 surrounding the tube 14 immediately above the top portion 20 of the connecting member 18. A notch between the two semi-cylindrical portions receives the nozzle 12. The loop 36 resiliently engages the tube and the semi-cylindrical portions of the hood resiliently engage the support 10, the result being that the hood is frictionally held and can be readily put in place or removed as necessary.

It will be seen that when the hood is in place the flame arising from the briquet F is protected and will not be blown out by draft or wind.

Such terms as "horizontal," "vertical" and the like are herein used for purposes of clarity of description, but they are to be interpreted merely as setting forth relative positions of parts and not as limiting the invention as concerns the position of the blow torch during use. As a matter of fact, the blow torch can be turned to any desired position during use, and one of the important advantages thereof is that the solid fuel briquets permit use in any position without the danger of fuel leakage which is inherent in blow torches using liquid fuel.

What I claim is:

1. In a blow torch, the combination of a rigid tube having a main vertical portion and having a short horizontal portion at the top constituting a nozzle, means for supplying air under pressure to the bottom of the tube, a sheet metal holding member having two vertically spaced horizontal portions apertured to receive and receiving the vertical portion of the tube and having a connecting portion which frictionally engages the tube between the two horizontal portions, and a support for a briquet of solid fuel carried by the upper horizontal section of the holding member and normally positioned immediately beneath the path of a jet from the nozzle.

2. In a blow torch, the combination of a rigid tube having a main vertical portion provided with a flat face at one side and having a short horizontal portion at the top constituting a nozzle, means for supplying air under pressure to the bottom of the tube, a sheet metal holding member having two vertically spaced horizontal portions apertured to receive the vertical portion of the tube and having a connecting portion which engages the tube between the two horizontal portions, said connecting portion of the holding member permitting angular movement of the said member relatively to the tube but normally engaging the flat face of the tube to retain the said member in a predetermined angular position, and a support for a briquet of solid fuel carried by the upper horizontal section of the holding member and normally positioned immediately beneath the path of a jet from the nozzle when the connecting portion of the said member is engaged with the flat face of the tube.

3. In a blow torch, the combination of a rigid tube having a main vertical portion and having a short horizontal portion at the top constituting a nozzle, a heat insulating handle surrounding the lower part of the vertical portion of the tube, means for supplying air under pressure to the bottom of the tube below the handle, a sheet metal holding member having two vertically spaced horizontal portions apertured to receive the vertical portion of the tube above the handle and having a connecting portion which frictionally engages the tube between the two horizontal portions, and a support for a briquet of solid fuel carried by the upper horizontal section of the holding member and normally positioned immediately beneath the path of a jet from the nozzle.

HAROLD W. BIRK.

REFERENCES CITED

The following references are of record in the file of this patent:

UNITED STATES PATENTS

| Number | Name | Date |
|---|---|---|
| 542,451 | Taylor | July 9, 1895 |
| 617,729 | Filley | Jan. 17, 1899 |
| 626,723 | Roberts | June 13, 1899 |
| 1,551,069 | Stanczyk | Aug. 25, 1925 |

FOREIGN PATENTS

| Number | Country | Date |
|---|---|---|
| 887 | Great Britain | Apr. 18, 1854 |
| 3,026 | Great Britain | June 27, 1882 |